United States Patent
Zhang et al.

(10) Patent No.: US 10,114,278 B1
(45) Date of Patent: Oct. 30, 2018

(54) LIGHT SPLITTING MODULE AND PROJECTION APPARATUS THEREOF

(71) Applicant: QISDA CORPORATION, Taoyuan (TW)

(72) Inventors: Jia-Ming Zhang, Taichung (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/954,622

(22) Filed: Apr. 17, 2018

(30) Foreign Application Priority Data

Mar. 30, 2018 (CN) .......................... 2018 1 0277006

(51) Int. Cl.
*G03B 21/20* (2006.01)
*H04N 9/31* (2006.01)

(52) U.S. Cl.
CPC ....... *G03B 21/2053* (2013.01); *G03B 21/204* (2013.01); *G03B 21/2013* (2013.01); *H04N 9/3111* (2013.01); *H04N 9/3114* (2013.01); *H04N 9/3117* (2013.01)

(58) Field of Classification Search
CPC ............ G03B 21/2006; G03B 21/2013; G03B 21/2033; G03B 21/204; G03B 21/2053; G03B 21/206; G03B 21/2093; H04N 9/3111; H04N 9/3114; H04N 9/3117
See application file for complete search history.

(56) References Cited

U.S. PATENT DOCUMENTS

| | | | | |
|---|---|---|---|---|
| 8,922,722 | B2* | 12/2014 | Huang | H04N 13/0418 349/13 |
| 9,417,511 | B2* | 8/2016 | Takahashi | G03B 21/204 |
| 9,568,165 | B2* | 2/2017 | Huang | F21V 9/08 |
| 9,897,907 | B2* | 2/2018 | Hsieh | G03B 21/2013 |
| 9,900,564 | B2* | 2/2018 | Li | G02B 27/10 |
| 9,977,317 | B2* | 5/2018 | Wang | G02B 26/008 |
| 2013/0321718 | A1* | 12/2013 | Huang | H04N 13/0418 349/5 |
| 2014/0340649 | A1* | 11/2014 | Takahashi | G03B 21/204 353/31 |
| 2015/0316775 | A1* | 11/2015 | Hsieh | G03B 21/2013 353/31 |
| 2015/0338061 | A1* | 11/2015 | Huang | F21V 9/08 353/31 |
| 2016/0105651 | A1* | 4/2016 | Wang | H04N 9/3114 353/31 |
| 2016/0377966 | A1* | 12/2016 | Hsu | G03B 33/00 362/84 |

(Continued)

*Primary Examiner* — Bao-Luan Le

(57) ABSTRACT

A light splitting module includes a first light source emitting first and second primary color lights, a second light source emitting a third primary color light, a color wheel and a modulator. The color wheel is aligned with the first and second light sources for splitting lights of the first and second light sources into image forming lights. The color wheel has first and second color sections and a transparent section. The first color section allows the first and third primary color lights to pass through. The second color section allows the second and third primary color lights to pass through. The modulator is coupled to the first and second light sources and the color wheel for modulating an incidence time of the first light source on the first color section to adjust an output ratio of the first primary color light in the image forming lights.

16 Claims, 6 Drawing Sheets

(56) References Cited

U.S. PATENT DOCUMENTS

| | | | |
|---|---|---|---|
| 2017/0048501 A1* | 2/2017 | Li | G02B 27/10 |
| 2017/0048502 A1* | 2/2017 | Guo | F21V 9/40 |
| 2017/0315430 A1* | 11/2017 | Wang | G02B 26/008 |
| 2017/0329214 A1* | 11/2017 | Guo | G03B 21/2013 |
| 2017/0357151 A1* | 12/2017 | Okuda | G03B 21/204 |
| 2018/0080630 A1* | 3/2018 | Wang | F21V 9/30 |
| 2018/0129124 A1* | 5/2018 | Hu | G02B 27/10 |
| 2018/0129126 A1* | 5/2018 | Liao | G02B 26/008 |
| 2018/0149957 A1* | 5/2018 | Maeda | G02B 26/008 |
| 2018/0157028 A1* | 6/2018 | Liao | G02B 26/008 |
| 2018/0164667 A1* | 6/2018 | Wang | G02B 26/00 |
| 2018/0173087 A1* | 6/2018 | Hsieh | G03B 21/2013 |
| 2018/0188640 A1* | 7/2018 | Huang | G03B 21/204 |
| 2018/0199013 A1* | 7/2018 | Wu | H04N 9/3117 |

* cited by examiner

LIGHT SPLITTING MODULE AND PROJECTION APPARATUS THEREOF

BACKGROUND OF THE INVENTION

1. Field of the Invention

The present invention relates to a light splitting module and a projection apparatus thereof, and more specifically, to a light splitting module modulating an incidence time of a color light mixed by two primary color lights on a secondary color section of a color wheel for color light output adjustment and a projection apparatus thereof.

2. Description of the Prior Art

DLP (Digital Light Processing) is the projection technology applying mirror reflection imaging principle for projecting color images. A conventional DLP projector usually has a light source, a color wheel, a DMD (Digital Micromirror Device) and a projector lens module disposed therein. The light path of the DLP projector is described as follows. First, light (e.g. white light) emitted by the light source passes through different color sections (e.g. RGB color sections) formed on the color wheel so as to generate a plurality of different image forming lights (e.g. RGB color lights). Subsequently, the image forming lights reach the digital micromirror device after several reflections or refractions. Finally, the projector lens module receives the image forming lights modulated by the digital micromirror device for projecting a corresponding color image.

However, the aforesaid light splitting design causes the problem that brightness of the projected color image is negatively correlated to CLO (Color Light Output) of the projected color image. For example, if it is desired to enhance the red color light output of the projected color image, the color section configuration of the color wheel needs to be modified to expand the red color section on the color wheel, so as to greatly decrease the brightness of the projected color image. On the contrary, if it is desired to increase the brightness of the projected color image, the color section configuration of the color wheel needs to be modified to expand a transparent section on the color wheel, so as to reduce the RGB color sections on the color wheel. Accordingly, the color performance of the projected color image is influenced as the brightness is increased. In summary, once the color section configuration of the color wheel is determined, the aforesaid problem greatly limits flexibility of the DLP projector in brightness and CLO adjustment.

Furthermore, in the prior art, the DLP projector usually needs to utilize a color wheel with a high rotation speed (e.g. 240 HZ) to project a color image with a higher resolution (e.g. 4K resolution). However, the aforesaid high-speed color wheel not only increases the manufacturing cost of the DLP projector, but also causes annoying vibration and noise during operation of the DLP projector.

SUMMARY OF THE INVENTION

The present invention provides a light splitting module. The light splitting module includes at least one first light source, at least one second light source, a color wheel, and a modulator. The first light source emits a first color light. The first color light includes a first primary color light and a second primary color light. The second light source emits a second color light. The second color light includes a third primary color light. The color wheel is aligned with the first light source and the second light source for splitting the first color light and the second color light into a plurality of image forming lights in a duty cycle. The color wheel has a first color section, a second color section and a transparent section formed thereon. The first color section allows the second color light and the first primary color light to pass through. The second color section allows the second color light and the second primary color light to pass through. The modulator is coupled to the first light source, the second light source and the color wheel for selectively modulating a first incidence time of the first color light on the first color section to adjust a first output ratio of the first primary color light in the plurality of image forming lights, modulating a second incidence time of the first color light on the second color section to adjust a second output ratio of the second primary color light in the plurality of image forming lights and modulating a third incidence time of the first color light on the transparent section to perform brightness adjustment of the plurality of image forming lights.

The present invention further provides a projection apparatus. The projection apparatus includes a light splitting module and an image forming projector. The light splitting module includes at least one light source, at least one second light source, a color wheel, and a modulator. The first light source emits a first color light. The first color light includes a first primary color light and a second primary color light. The second light source emits a second color light. The second color light includes a third primary color light. The color wheel is aligned with the first light source and the second light source for splitting the first color light and the second color light into a plurality of image forming lights in a duty cycle. The color wheel has a first color section, a second color section and a transparent section formed thereon. The first color section allows the second color light and the first primary color light to pass through. The second color section allows the second color light and the second primary color light to pass through. The modulator is coupled to the first light source, the second light source and the color wheel for selectively modulating a first incidence time of the first color light on the first color section to adjust a first output ratio of the first primary color light in the plurality of image forming lights, modulating a second incidence time of the first color light on the second color section to adjust a second output ratio of the second primary color light in the plurality of image forming lights, and modulating a third incidence time of the first color light on the transparent section to perform brightness adjustment of the plurality of image forming lights. The image forming projector receives the plurality of image forming lights for forming and projecting a color image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
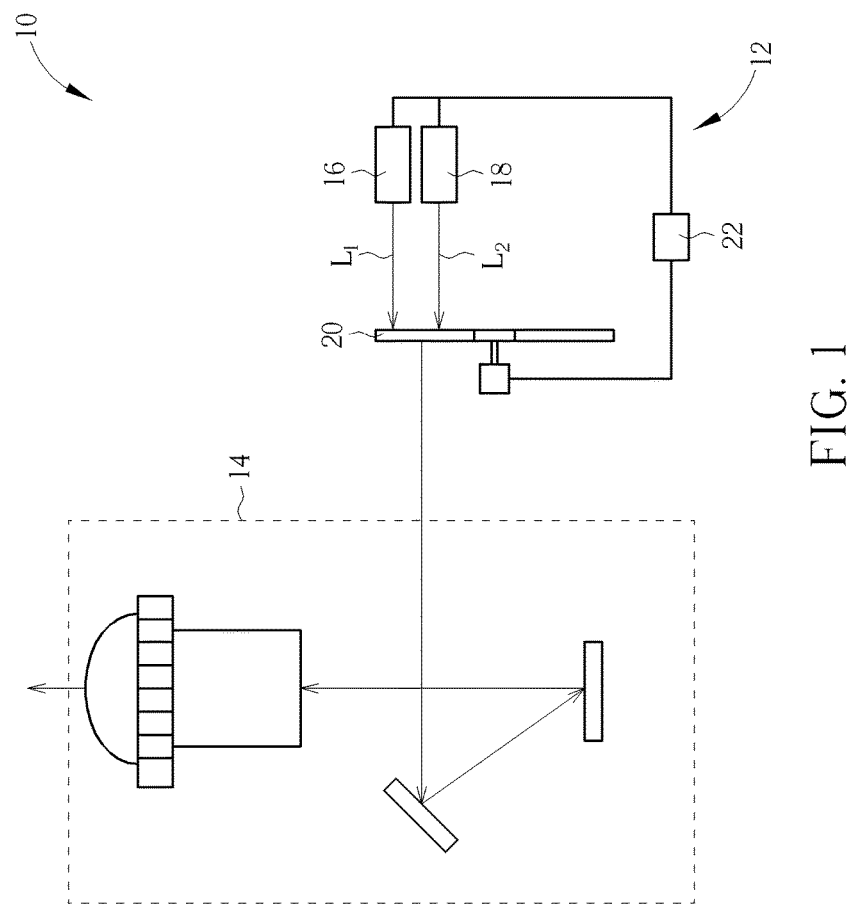
FIG. 1 is a diagram of a projector apparatus according to an embodiment of the present invention.

Please refer to FIG. 1, which is a diagram of a projector apparatus 10 according to an embodiment of the present invention. The projection apparatus 10 could preferably be a DLP projector (but not limited thereto) and includes a light splitting module 12 and an image forming projector 14. The image forming projector 14 is used for receiving image forming lights split by the light splitting module 12 for forming and projecting a corresponding color image. The image forming projector 14 could include optical projector components (e.g. a digital micromirror device, a projector lens module, etc.) commonly applied to color image projection, and the related description is omitted herein since it is commonly seen in the prior art.

As shown in FIG. 1, the light splitting module 12 includes at least one first light source 16 (one shown in FIG. 1, but not limited thereto), at least one second light source 18 (one shown in FIG. 1, but not limited thereto), a color wheel 20, and a modulator 22. The first light source 16 and the second light source 18 could be any light source suitable for a conventional optical projector, such as laser diode, LED (Light Emitting Diode), arrays of LEDs, or other solid state sources. In this embodiment, the first light source 16 emits a first color light $L_1$ including a first primary color light and a second primary color light, and the second light source 18 emits a second color light $L_2$ including a third primary color light (but not limited thereto, meaning that the present invention could adopt the design the second color light $L_2$ could be mixed by the third primary color light and one of the first primary color light and the second primary color light in another embodiment, such as a magenta color light mixed by red and blue colors).

The color wheel 20 is aligned with the first light source 16 and the second light source 18 for splitting the first color light $L_1$ and the second color light $L_2$ into a plurality of image forming lights in one duty cycle. The color wheel 20 has a first color section $S_1$, a second color section $S_2$ and a transparent section $S_3$ formed thereon. The first color section $S_1$ could allow the second color light $L_2$ and the first primary color light of the first color light $L_1$ to pass through, and the second color section $S_2$ could allow the second color light $L_2$ and the second primary color light of the first color light $L_1$ to pass through.

The modulator 22 is coupled to the first light source 16, the second light source 18 and the color wheel 20 for selectively modulating an incidence time of the first color light $L_1$ on the first color section $S_1$ to adjust an output ratio of the first primary color light in the image forming lights, modulating an incidence time of the first color light $L_1$ on the second color section $S_2$ to adjust an output ratio of the second primary color light in the image forming lights, and modulating an incidence time of the first color light $L_1$ on the transparent section $S_3$ to perform brightness adjustment of the image forming lights.

Figure 3:
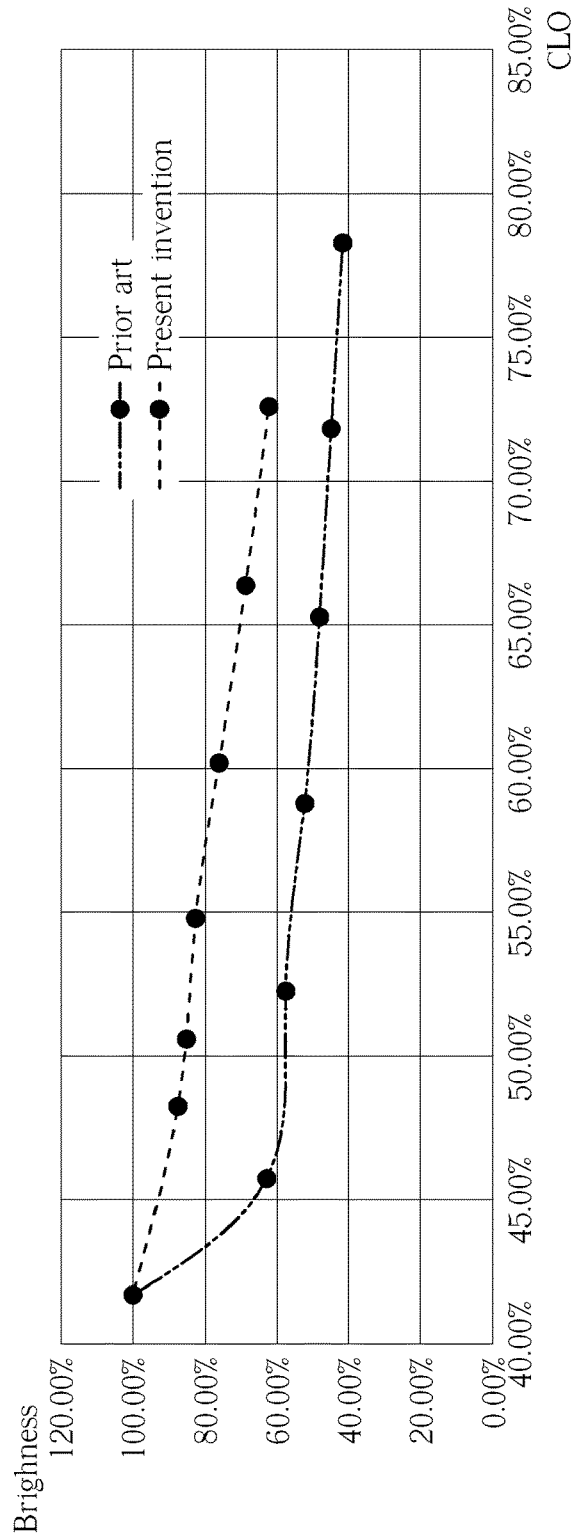
FIG. 3 is a brightness-CLO diagram of the projector apparatus in FIG. 1.

To be noted, the modulator 22 could preferably modulate the first light source 16 or the second light source 18 according to a driving waveform for brightness enhancement of the image forming lights, so as to reduce brightness loss of the projector apparatus 10 in color image projection. That is to say, the modulator 22 could use a special waveform supplying a strengthened pulse to enhance brightness of a specific image forming light (e.g. red light). In practical application, relationship between brightness and CLO performance of the projector apparatus 10 is as shown in FIG. 3, meaning that the present invention can greatly reduce brightness loss when enhancing the CLO performance of the projector apparatus 10 as compared to the prior art. As for the related description for the aforesaid waveform driving method, it is commonly seen in the prior art and omitted herein for simplicity.

Figure 2:
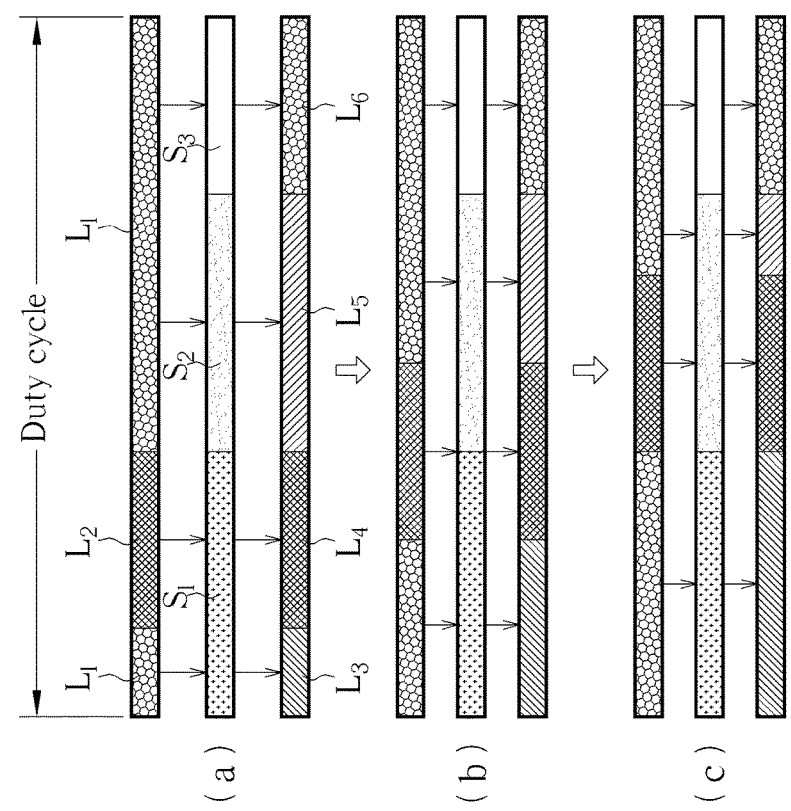
FIG. 2 is a sequence diagram of a first color light and a second color light in FIG. 1 passing through a first color section, a second color section and a transparent section to generate image forming lights.

More detailed description for brightness and CLO adjustment of the projector apparatus 10 is provided as follows. Please refer to FIG. 1, FIG. 2, and FIG. 3. FIG. 2 is a sequence diagram of the first color light $L_1$ and the second color light $L_2$ in FIG. 1 passing through the first color section $S_1$, the second color section $S_2$ and the transparent section $S_3$ to generate image forming lights $L_3$, $L_4$, $L_5$, $L_6$. FIG. 3 is a brightness-CLO diagram of the projector apparatus 10 in FIG. 1. In this embodiment, the first primary color light could be a red light, the second primary color light could be a green light, the third primary color light could be a blue light, the first color light $L_1$ could include a yellow light mixed by the red light and the green light, the first color section $S_1$ could be a magenta color (mixed by red and blue colors) section, and the second color section $S_2$ could be a cyan color (mixed by green and blue colors) section (but not limited thereto). Accordingly, as shown in FIG. 2(a), the first color light $L_1$ could pass through the first color section $S_1$, the second color section $S_2$ and the transparent section $S_3$ to generate the image forming light $L_3$ (red), the image forming light $L_5$ (green) and the image forming light $L_6$ (yellow), and the second color light $L_2$ could pass through the first color section $S_1$ to generate the image forming light $L_4$ (blue). That is to say, in one duty cycle, the color wheel 20 can split the first color light $L_1$ and the second color light $L_2$ to output the image forming lights $L_3$, $L_4$, $L_5$, $L_6$ in RGBY format for subsequent color image projection.

If it is desired to adjust the CLO performance of the projector apparatus 10, the projector apparatus 10 can utilize the modulator 22 to properly modulate delay time between the color wheel 20 and the first and second light sources 16, 18 for achieving the CLO adjustment purpose. For example, as shown in FIG. 2(b), the modulator 22 could increase the incidence time of the first color light $L_1$ on the first color section $S_1$ to increase overlap between the first color light $L_1$ and the first color section $S_1$ which allows the first primary color light (red) of the first color light $L_1$ to pass through. As such, the output ratio of the image forming light $L_3$ (red) in the duty cycle is accordingly increased so as to enhance the CLO performance of the projector apparatus 10. Moreover, as shown in FIG. 2(c), the modulator 22 could further increase the incidence time of the first color light $L_1$ on the first color section $S_1$ to make the first color light $L_1$ pass through the first color section $S_1$, the second color section $S_2$ and the transparent section $S_3$ and make the second color light $L_2$ only pass through the second color section $S_2$. Accordingly, the output ratio of the image forming light $L_3$ (red) in the duty cycle can be maximized, so as to further enhance the CLO performance of the projector apparatus 10. As for adjustment for the output ratio of the second primary color light (green) of the first color light in the duty cycle, the related description could be reasoned by analogy according to the aforesaid description and omitted herein.

On the other hand, if it is desired to adjust the brightness performance of the projector apparatus 10, the projector apparatus 10 can also utilize the modulator 22 to properly modulate delay time between the color wheel 20 and the first and second light sources 16, 18 for achieving the brightness adjustment purpose. For example, as shown in FIG. 2(a), the modulator 22 could increase the incidence time of the first color light $L_1$ on the transparent section $S_3$ to maximize overlap between the first color light $L_1$ and the transparent section $S_3$. Accordingly, the output ratio of the image forming light $L_6$ (yellow) in the duty cycle can be maximized, so as to enhance the brightness performance of the projector apparatus 10.

Compared with the prior art, the light splitting module provided by the present invention modulates the incidence time of the first color light (mixed by two primary color lights) on the first color section, the second color section or the transparent section of the color wheel for flexibly adjusting the CLO or brightness performance of the projector apparatus without modifying the color section configuration on the color wheel. In such a manner, the present invention can greatly improve flexibility of the projector apparatus in brightness and CLO adjustment.

Figure 4:
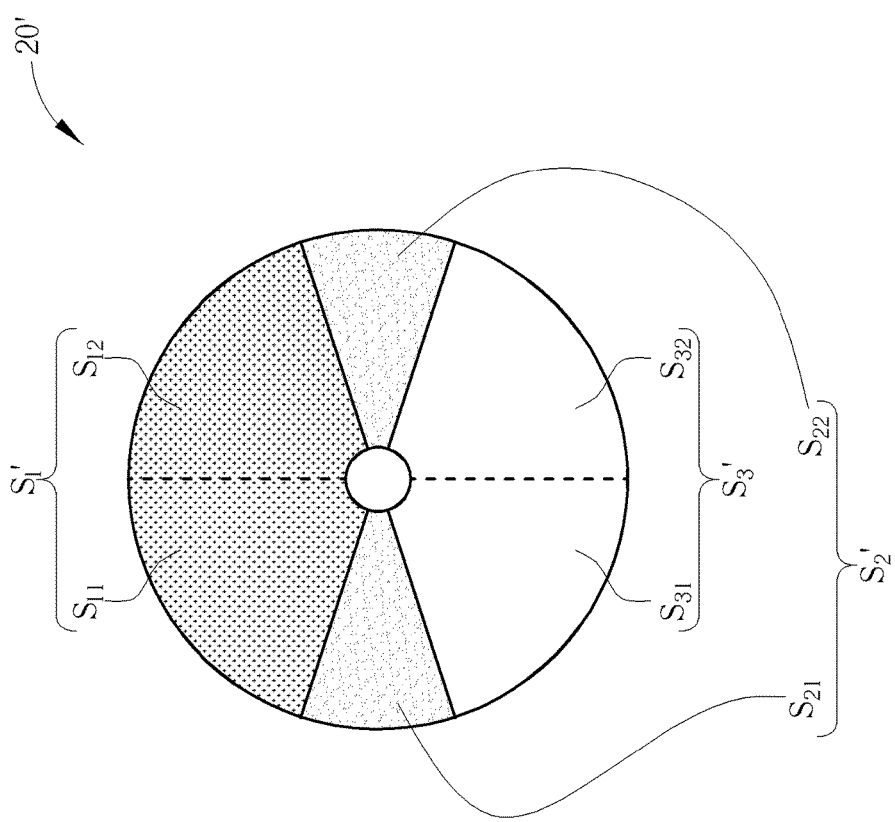
FIG. 4 is a diagram of a color wheel according to another embodiment of the present invention.
Figure 5:
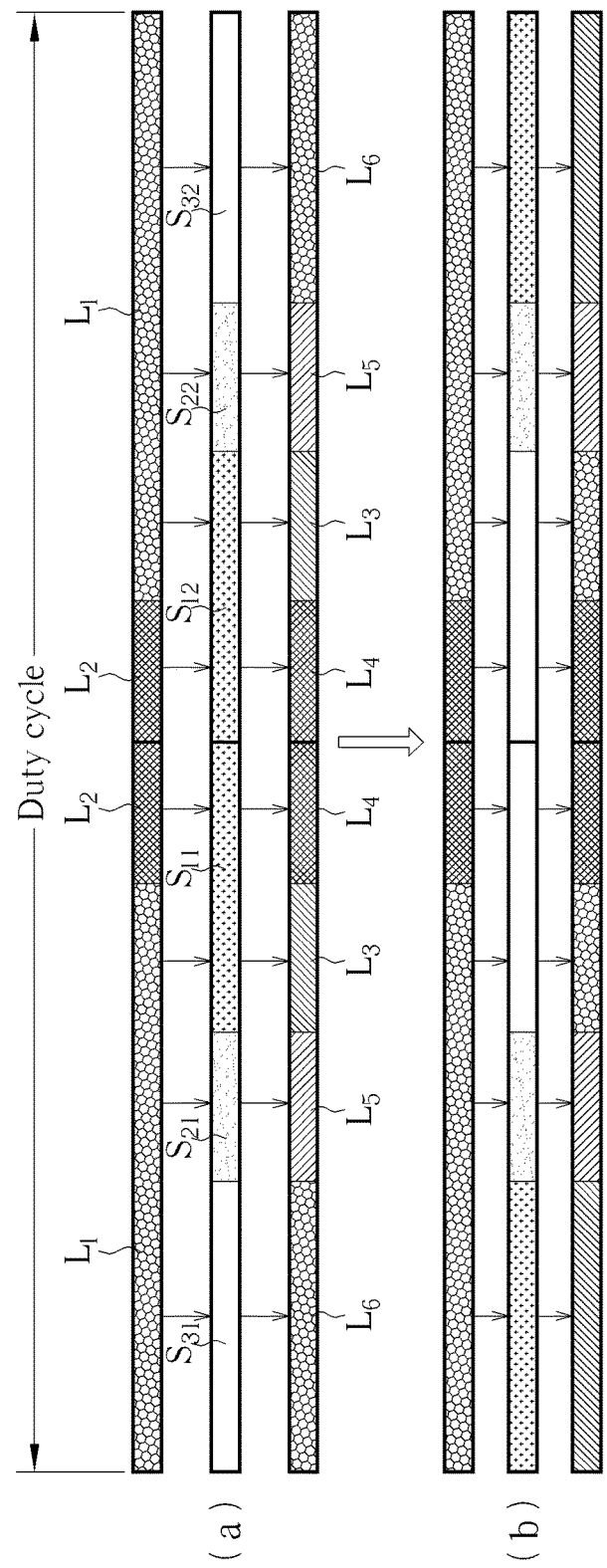
FIG. 5 is a sequence diagram of the first color light and the second color light passing through a first color section, a second color section and a transparent section in FIG. 4 to generate image forming lights.
Figure 6:
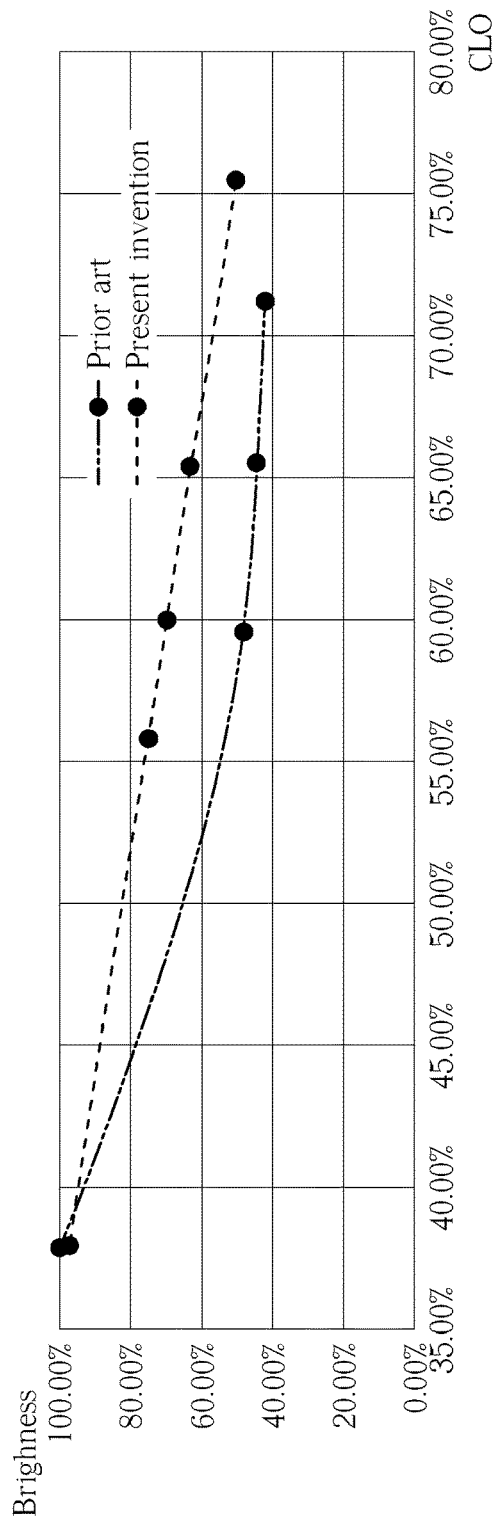
FIG. 6 is a brightness-CLO diagram corresponding to the color wheel in FIG. 4.

It should be mentioned that the color section configuration of the color wheel is not limited to the aforesaid embodiment. Please refer to FIG. 4, FIG. 5, and FIG. 6. FIG. 4 is a diagram of a color wheel 20' according to another embodiment of the present invention. FIG. 5 is a sequence diagram of the first color light $L_1$ and the second color light $L_2$ passing through a first color section $S_1'$, a second color section $S_2'$ and a transparent section $S_3'$ in FIG. 4 to generate the image forming lights $L_3$, $L_4$, $L_5$, $L_6$. FIG. 6 is a brightness-CLO diagram corresponding to the color wheel 20' in FIG. 4. Components both mentioned in this embodiment and the aforesaid embodiment represent components with similar structures and functions. As shown in FIG. 4 and FIG. 5, the color wheel 20' could have the first color section $S_1'$, the second color section $S_2'$ and the transparent section $S_3'$. The first color section $S_1'$ could include a first subsection $S_{11}$ and a second subsection $S_{12}$. The second color section $S_2'$ could include a third subsection $S_{21}$ and a fourth subsection $S_{22}$. The transparent section $S_3'$ could include a fifth subsection $S_{31}$ and a sixth subsection $S_{32}$. The first subsection $S_{11}$, the third subsection $S_{21}$ and the fifth subsection $S_{31}$ could be formed on the color wheel 20' with the second subsection $S_{12}$, the fourth subsection $S_{22}$ and the sixth subsection $S_{32}$ in a symmetrical arrangement (as shown in FIG. 4).

Via the aforesaid design, the color wheel 20' can split the first color light $L_1$ and the second color light $L_2$ to the plurality of image forming lights including two sets of RGBY color lights in one duty cycle. For example, in this embodiment, the first color light $L_1$ could include a yellow light mixed by a red light and a green light, the second color light $L_2$ could include a blue light, the first color section $S_1'$ could be a magenta color section, and the second color section $S_2'$ could be a cyan color section (but not limited thereto). Accordingly, as shown in FIG. 5(a), the first color light $L_1$ could pass through the first subsection $S_{11}$, the second subsection $S_{12}$, the third subsection $S_{21}$, the fourth subsection $S_{22}$, the fifth subsection $S_{31}$ and the sixth subsection $S_{32}$ to output the two image forming lights $L_3$ (red), the two image forming lights $L_5$ (green) and the two image forming lights $L_6$ (yellow). Furthermore, the second color light $L_2$ could pass through the first subsection $S_{11}$ and the second subsection $S_{12}$ to generate the two image forming lights $L_4$ (blue). That is to say, in one duty cycle, the color wheel 20' can split the first color light $L_1$ and the second color light $L_2$ to output the two sets of RGBY color lights, so as to be suitable for 4K image projection without increasing the rotating speed of the color wheel 20' or replacing the color wheel 20' with a new high-speed color wheel. In practical application, the brightness-CLO relationship corresponding to the color wheel 20' is as shown in FIG. 6, meaning that the present invention can greatly reduce brightness loss when enhancing the CLO performance as compared to the prior art.

In such a manner, the present invention can solve the prior art problem that the high-speed color wheel increases the manufacturing cost of the DLP projector and causes annoying vibration and noise during operation of the DLP projector. Moreover, the aforesaid symmetrical arrangement design as shown in FIG. 4 can reduce amount of spokes on the color wheel 20', so as to enhance the CLO performance corresponding to the color wheel 20'.

Similarly, the modulator 22 (not shown in FIGS. 4-6) can properly modulate delay time between the color wheel 20' and the first and second color lights $L_1$, $L_2$ for achieving the CLO adjustment purpose. For example, as shown in FIG. 5(b), the modulator 22 can delay rotation of the color wheel 20' by a half cycle time for modulating the second color light $L_2$ to be emitted to the fifth subsection $S_{31}$ and the sixth subsection $S_{32}$ and modulating the first color light $L_1$ to be emitted to the first color section $S_1'$, the second color section $S_2'$ and the transparent section $S_3'$ in the duty cycle. Accordingly, the output ratio of the image forming light $L_3$ (red) in the duty cycle can be maximized, so as to further enhance the CLO performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light splitting module comprising:
   at least one first light source for emitting a first color light, the first color light comprising a first primary color light and a second primary color light;
   at least one second light source for emitting a second color light, the second color light comprising a third primary color light;
   a color wheel aligned with the first light source and the second light source for splitting the first color light and the second color light into a plurality of image forming lights in a duty cycle, the color wheel having a first color section, a second color section and a transparent section formed thereon, the first color section allowing the second color light and the first primary color light to pass through, the second color section allowing the second color light and the second primary color light to pass through; and
   a modulator coupled to the first light source, the second light source and the color wheel for selectively modulating a first incidence time of the first color light on the first color section to adjust a first output ratio of the first primary color light in the plurality of image forming lights, modulating a second incidence time of the first color light on the second color section to adjust a second output ratio of the second primary color light in the plurality of image forming lights and modulating a third incidence time of the first color light on the transparent section to perform brightness adjustment of the plurality of image forming lights.

2. The light splitting module of claim 1, wherein the first primary color light is a red light, the second primary color light is a green light, the third primary color light is a blue light, the first color light comprises a yellow light mixed by the red light and the green light, the first color section is a magenta color section, the second color section is a cyan color section, and the color wheel splits the first color light and the second color light to output the plurality of image forming lights in RGBY (Red, Green, Blue, Yellow) format.

3. The light splitting module of claim 2, wherein the modulator increases the first incidence time of the first color light on the first color section to increase the first output ratio of the red light in the plurality of image forming lights in the duty cycle.

4. The light splitting module of claim 2, wherein the first color section comprises a first subsection and a second subsection, the second color section comprises a third subsection and a fourth subsection, the transparent section comprises a fifth subsection and a sixth subsection, and the first subsection, the third subsection and the fifth subsection are formed on the color wheel with the second subsection, the fourth subsection and the sixth subsection in a symmetrical arrangement.

5. The light splitting module of claim 4, wherein when the modulator modulates the first and second light sources or the color wheel for emitting the second color light to the first and second subsections and emitting the first color light to the first, second, third, fourth, fifth and sixth subsections in the duty cycle, the plurality of image forming lights comprises two sets of RGBY color lights in the duty cycle.

6. The light splitting module of claim 5, wherein the modulator delays rotation of the color wheel by a half cycle time for modulating the second color light to be emitted to the fifth and sixth subsections and modulating the first color light to be emitted to the first, second, third, fourth, fifth and sixth subsections in the duty cycle.

7. The light splitting module of claim 1, wherein the modulator modulates the first light source or the second light source according to a driving waveform for brightness enhancement of the plurality of image forming lights.

8. The light splitting module of claim 1, wherein the second color light further comprises one of the first primary color light and the second primary color light.

9. A projection apparatus comprising:
  a light splitting module comprising:
    at least one first light source for emitting a first color light, the first color light comprising a first primary color light and a second primary color light;
    at least one second light source for emitting a second color light, the second color light comprising a third primary color light;
    a color wheel aligned with the first light source and the second light source for splitting the first color light and the second color light into a plurality of image forming lights in a duty cycle, the color wheel having a first color section, a second color section and a transparent section formed thereon, the first color section allowing the second color light and the first primary color light to pass through, the second color section allowing the second color light and the second primary color light to pass through; and
    a modulator coupled to the first light source, the second light source and the color wheel for selectively modulating a first incidence time of the first color light on the first color section to adjust a first output ratio of the first primary color light in the plurality of image forming lights, modulating a second incidence time of the first color light on the second color section to adjust a second output ratio of the second primary color light in the plurality of image forming lights, and modulating a third incidence time of the first color light on the transparent section to perform brightness adjustment of the plurality of image forming lights; and
  an image forming projector receiving the plurality of image forming lights for forming and projecting a color image.

10. The projection apparatus of claim 9, wherein the first primary color light is a red light, the second primary color light is a green light, the third primary color light is a blue light, the first color light comprises a yellow light mixed by the red light and the green light, the first color section is a magenta color section, the second color section is a cyan color section, and the color wheel splits the first color light and the second color light to output the plurality of image forming lights in RGBY format.

11. The projection apparatus of claim 10, wherein the modulator increases the first incidence time of the first color light on the first color section to increase the first output ratio of the red light in the plurality of image forming lights in the duty cycle.

12. The projection apparatus of claim 10, wherein the first color section comprises a first subsection and a second subsection, the second color section comprises a third subsection and a fourth subsection, the transparent section comprises a fifth subsection and a sixth subsection, and the first subsection, the third subsection and the fifth subsection are formed on the color wheel with the second subsection, the fourth subsection and the sixth subsection in a symmetrical arrangement.

13. The projection apparatus of claim 12, wherein when the modulator modulates the first and second light sources or the color wheel for emitting the second color light to the first and second subsections and emitting the first color light to the first, second, third, fourth, fifth and sixth subsections in the duty cycle, the plurality of image forming lights comprises two sets of RGBY color lights in the duty cycle.

14. The projection apparatus of claim 13, wherein the modulator delays rotation of the color wheel by a half cycle time for modulating the second color light to be emitted to the fifth and sixth subsections and modulating the first color light to be emitted to the first, second, third, fourth, fifth and sixth subsections in the duty cycle.

15. The projection apparatus of claim 9, wherein the modulator modulates the first light source or the second light source according to a driving waveform for brightness enhancement of the plurality of image forming lights.

16. The projection apparatus of claim 9, wherein the second color light further comprises one of the first primary color light and the second primary color light.

\* \* \* \* \*